(12) United States Patent
Fontanes-Perez et al.

(10) Patent No.: US 11,616,894 B1
(45) Date of Patent: Mar. 28, 2023

(54) METHOD AND APPARATUS TO ADD MACHINE READABLE CODES TO LIMIT REPRODUCTION OF DOCUMENTS

(71) Applicant: Xerox Corporation, Norwalk, CT (US)

(72) Inventors: Mirelsa Fontanes-Perez, Webster, NY (US); Sanja Pstrocki-Porras, Rochester, NY (US); Cheryl A. Nazzaro, Fairport, NY (US); Dianne Colelli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/653,427

(22) Filed: Mar. 3, 2022

(51) Int. Cl.
*H04N 1/44* (2006.01)
*H04N 1/00* (2006.01)

(52) U.S. Cl.
CPC ....... *H04N 1/4433* (2013.01); *H04N 1/00334* (2013.01); *H04N 1/00737* (2013.01); *H04N 1/4413* (2013.01); *H04N 2201/218* (2013.01)

(58) Field of Classification Search
None
See application file for complete search history.

(56) References Cited

U.S. PATENT DOCUMENTS

| | | | | |
|---|---|---|---|---|
| 9,961,230 | B2 | 5/2018 | Eschbach et al. | |
| 2004/0252337 | A1* | 12/2004 | Takabayashi | H04N 1/00188 358/1.14 |
| 2006/0126096 | A1* | 6/2006 | Yasukaga | G06F 40/174 358/1.14 |
| 2007/0170250 | A1* | 7/2007 | Bystrom | G07F 7/08 235/382 |
| 2007/0177824 | A1* | 8/2007 | Cattrone | G06F 16/93 707/E17.008 |
| 2009/0190183 | A1* | 7/2009 | Hosoda | H04N 1/00482 382/100 |
| 2011/0317201 | A1* | 12/2011 | Kakutani | H04N 1/32101 358/1.14 |
| 2012/0188581 | A1* | 7/2012 | Kakutani | H04N 1/00846 358/1.14 |
| 2012/0191601 | A1* | 7/2012 | Yoshida | G06F 3/1203 705/40 |
| 2013/0128296 | A1* | 5/2013 | Takahashi | H04N 1/00363 358/1.13 |
| 2016/0360062 | A1* | 12/2016 | Irons | H04N 1/32144 |
| 2017/0214829 | A1* | 7/2017 | Nakabayashi | H04N 1/00846 |
| 2017/0264777 | A1* | 9/2017 | Irons | H04N 1/32149 |
| 2020/0065638 | A1* | 2/2020 | Nakai | H04N 1/00962 |
| 2020/0084335 | A1* | 3/2020 | Guidotti | G06F 21/64 |

\* cited by examiner

*Primary Examiner* — Miya J Williams
*Assistant Examiner* — Miya J Cato

(57) ABSTRACT

A multi-function device (MFD) is disclosed. For example, the MFD includes a communication interface to establish a communication path with an authentication server, a user interface to receive document control information for a document to be generated, a processor, and a non-transitory computer-readable medium storing a plurality of instructions. The instructions when executed by the processor cause the processor to generate a machine readable code that contains the document control information for the document and print the machine readable code onto the document that is printed by the MFD.

16 Claims, 6 Drawing Sheets

METHOD AND APPARATUS TO ADD MACHINE READABLE CODES TO LIMIT REPRODUCTION OF DOCUMENTS

The present disclosure relates generally to document security and relates more particularly to a method and apparatus to generate and add machine readable codes to a document to limit reproduction of the document.

BACKGROUND

Documents can be generated by authors. The documents may include work documents, reports, literary works, images, and the like. Typically, a user or anyone who obtains a document can reproduce the document using a multi-function devices (MFDs). For example, the documents can be copied or scanned on the MFDs.

Some documents may have value or contain sensitive information. For example, a document may include personal information or a company trade secret. As a result, some users may want to add protection to documents to control unauthorized reproduction of the documents.

SUMMARY

According to aspects illustrated herein, there are provided a multi-function device (MFD) and a method for generating a machine readable code to limit reproduction of a document. One disclosed feature of the embodiments is an MFD that comprises a communication interface to establish a communication path with an authentication server, a user interface to receive document control information for a document to be generated, a processor, and a non-transitory computer-readable medium storing a plurality of instructions. The instructions when executed by the processor cause the processor to generate a machine readable code that contains the document control information for the document and print the machine readable code onto the document that is printed by the MFD.

Another disclosed feature is a method for generating a machine readable code to limit reproduction of a document. The method executed by a processor of the MFD comprises receiving document control information for a document to be generated on the MFD, generating a machine readable code that contains the document control information for the document, and printing the machine readable code onto the document that is printed by the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for adding machine readable codes to a document to limit reproduction of the document. As discussed above, some documents may have value or contain sensitive information. For example, a document may include personal information or a company trade secret. As a result, some users may want to add protection to documents to control unauthorized reproduction of the documents.

Some security features may include adding a water mark or other visual mark to the document where having an original copy may be important. For example, the water mark may indicate "copy" when the document is reproduced.

Other security features may include passwords or encryption of electronic files. However, these passwords or encryption cannot be applied to the document once the document is printed.

The present disclosure provides an apparatus and method to generate a machine readable code that can be added to a document by the MFD when the document is generated. The machine readable code may include authentication information, reproduction limits, a reproduction tracker, address information for an authentication server, and the like.

In one embodiment, the machine readable code may be generated electronically via an endpoint device or the MFD itself. The machine readable code can then be printed onto the document that is produced by the MFD.

In an example, the MFD may be modified to include software that recognizes the machine readable code. The MFD may scan the document for the machine readable code. If no machine readable code is found, the document may be reproduced without restriction. If a machine readable code is found, the MFP may contact an authentication server to authorize reproduction of the document. If reproduction is authorized, the MFP may transmit reproduction information to the authentication server for tracking (e.g., a number of copies, a number scans, a number of email transmissions with the document attached, and so forth).

Figure 1:
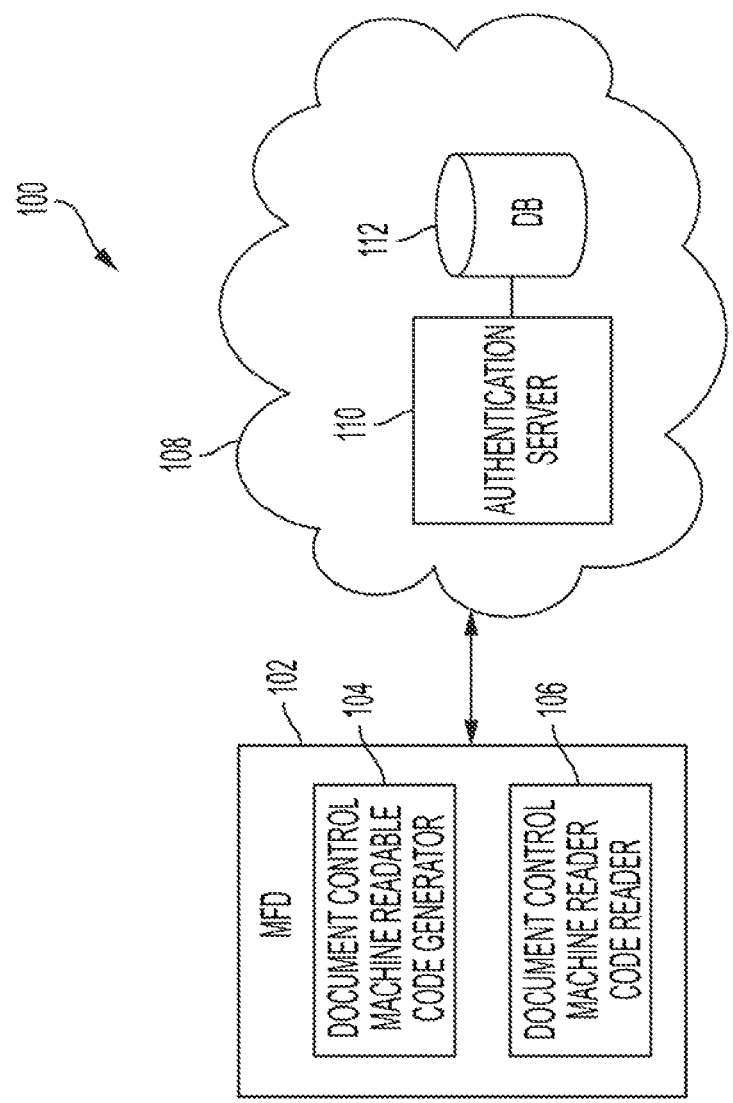
FIG. 1 illustrates a block diagram of an example network that includes a multi-function device (MFD) to generate and add machine readable codes on a document of the present disclosure.

FIG. 1 illustrates an example network 100 of the present disclosure. In one embodiment, the network 100 may include an apparatus 102, an Internet protocol (IP) network 108, an authentication server 100 and a database (DB) 112. The apparatus 102 may be a multi-function device (MFD). For example, the apparatus 102 may be able to perform print, copy, fax, scan, and email document functions.

In one embodiment, the IP network 108 may be any type of communication network that can transfer data using internet protocols. The IP network 108 may be the Internet, for example. The IP network 108 has been simplified for ease of explanation and may include additional network elements that are not shown. For example, the IP network 108 may include firewalls, gateways, switches, border elements, access networks, and the like.

In one embodiment, the apparatus 102 may include a document control machine readable code generator 104 and a document control machine readable code reader 106. For example, the apparatus 102 may include hardware and/or software to generate a machine readable code that can be printed onto a document to control reproduction of the document. Reproduction of the document may include copying the document, printing the document, scanning the document, electronically transmitting the document from the apparatus 102, and the like.

In one embodiment, a user may limit how a document can be reproduced when the document is generated on the apparatus 102. In another example, the document control information may be provided from an endpoint device (not shown) communicatively coupled to the apparatus 102. The apparatus 102 may use the document control information that is received to generate the machine readable code via the document control machine readable code generator 104.

In one embodiment, the machine readable code may be associated with a particular user and/or document. For example, a unique document number or file name of the document, as well as a username and password, may be provided to the apparatus 102 to generate the machine readable code. When the machine readable code is generated, the document control information in the machine readable code may also be registered with the authentication server 110 and stored in the DB 112.

In one embodiment, the machine readable code may be used to provide document control information and address information for the authentication server 110. The apparatus 102 may execute the document control machine readable code reader 106 to scan documents to detect the machine readable code. The address information of the authentication server 110 may be read to allow the apparatus 102 to connect to the authentication server 110 to retrieve document control information associated with the document.

In one embodiment, the authentication server 110 may be a remote server that includes a processor. The authentication server 110 may be communicatively coupled to the DB 112. The DB 112 may include authentication information and document control information associated with particular users and/or documents.

The document control information can be compared to information stored in the DB 112 to determine if the document is authorized to be reproduced and/or the user is authorized to reproduce the document. If the document is authorized for reproduction, the authentication server 110 may transmit an authentication signal or notification back to the apparatus 102 indicating that the reproduction job may be executed. The authentication signal may include the document control information, such as what reproduction functions can be performed (e.g., print only, copy only, scan only, or any combination thereof), how may copies can be reproduced, an expiration date and/or time (e.g., reproduction rights expire in 4 days for the authorized user), and so forth.

Figure 2:
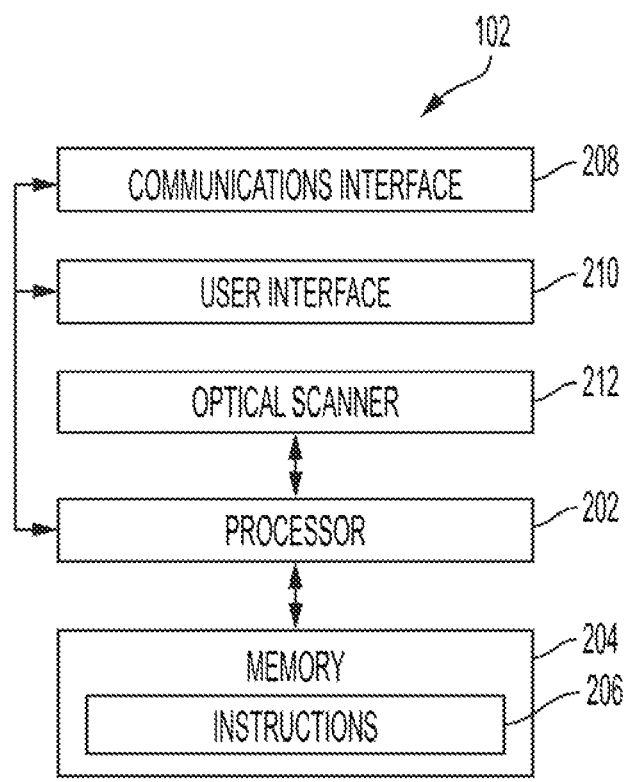
FIG. 2 illustrates a block diagram of an example MFD of the present disclosure.

FIG. 2 illustrates a block diagram of an example of the apparatus 102. In one embodiment, the apparatus 102 may include a processor 202, a memory 204, a communications interface 208, a user interface 210, and an optical scanner 212. The processor 202 may be communicatively coupled to the memory 204, the communications interface 208, user interface 210, and the optical scanner 212. The processor 202 may control operation of and/or transmit/receive data for controlling reproduction of a document via the communications interface 208, the user interface 210, and/or the optical scanner 212.

In one embodiment, the communications interface 208 may be to establish a communication path between the apparatus 102 and the authentication server 110 via the IP network 108. For example, the communications interface 208 may be a wireless or wired communication interface. For example, the communications interface 208 may be a WiFi radio, an Ethernet connection, a fax over IP connection that uses an RJ-111 connection, a cellular radio, and the like.

In one embodiment, the user interface 210 may be a graphical user interface (GUI). The user interface 210 may be a touch screen interface or be a GUI that receives inputs via a keyboard, mouse, a trackpad, and the like. The user interface 210 may provide prompts and/or data fields for a user to provide document control information used to generate the machine readable code. As noted above, the document control information may include an authorized username and password, allowable reproduction job types (e.g., copy, print, scan, fax, email, and the like), a number of reproductions allowed for each allowable job type (e.g., 500 copies, 500 pages of printing, 10 email transmissions, one scan, and the like), an expiration timer (e.g., the authorization expires in 1 hour, in 7 days, in 1 month, and the like), or any other document control information.

In one embodiment, the optical scanner 212 may be used to scan documents. The optical scanner 212 may be used to scan the documents to look for machine readable codes. If a machine readable code is found in a document, the reproduction of the document may be controlled in accordance with the document control information found in the machine readable code. If no machine readable code is found in the document, then the document may be reproduced without restriction.

In one embodiment, the memory 204 may be any type of non-transitory computer readable medium. For example, the memory 204 may be a hard disk drive, a solid state drive, a random access memory, a read only memory, and the like. The memory 204 may store instructions 206.

In one embodiment, the instructions 206 may be executed by the processor 202 to perform the functions described herein to generate a machine readable code to limit reproduction of a document and control reproduction of the document with the machine readable code. The instructions 206 may be used to execute the document control machine readable code generator 104 and the document control machine readable code reader 106. For example, the instructions 206 may cause the processor to perform operations of the method 400 illustrated in FIG. 4, and discussed in further detail below and the operations of method 500 illustrated in FIG. 5, and discussed in further detail below.

Figure 3:
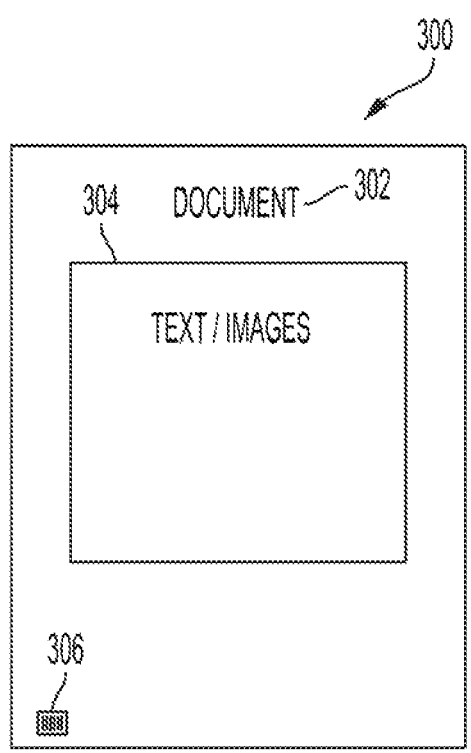
FIG. 3 illustrates a block diagram of an example document with a machine readable code to limit reproduction of a document of the present disclosure.

FIG. 3 illustrates an example of a document 300 that includes a machine readable code 306 to control or limit reproduction of the document 300. The document 300 may include text 302 and text or images 304. The machine readable code 306 may be printed on the document 300. In an example, the machine readable code 306 may be printed in a footer or header of the document 300 in a discrete fashion. In other words, the machine readable code 306 may be relatively small and minimally noticeable on the document 300.

In one embodiment, the machine readable code 306 may be a bar code or a quick response (QR) code. The machine readable code 306 may be printed on each page of the document 300 if multiple pages are printed.

As discussed above, the document 300 may be printed on the apparatus 102. A user may provide document control information to the apparatus 102 via the user interface 210 or an endpoint device (e.g., a mobile device, a laptop computer, a desktop computer, and the like) communicatively coupled to the apparatus 102. The document control information may be translated into the machine readable code 306. In other words, the machine readable code 306 may contain all of the document control information that is provided by the user to control or limit further reproduction of the document 300.

After the document 300 is printed, at a later time a user may place the document 300 on a platen glass of the apparatus 102 to try to execute a reproduction job request. The optical scanner 212 may scan the document 300 and detect the machine readable code 306. The processor 202 may analyze the machine readable code 306 to extract all of the document control information that was provided.

In one embodiment, machine readable code 306 may include an address of the authentication server 110. The apparatus 102 may establish a communication session with the authentication server 110. The apparatus 102 may transmit a username and password provided by the user when submitting the reproduction job request. The machine readable code 306 may also provide a document identifier of the document 300.

The authentication server 110 may then determine if the user is authorized to generate reproductions of the document 300. The authentication server 110 may also determine what types of reproduction job requests can be executed by the user. The authentication server 110 may provide authentication information to the apparatus 102. The authentication information may include what type of reproductions may be performed, how many copies of each job type, and the like.

In one embodiment, the user interface 210 may grey out or block buttons associated with reproduction types that are not allowed. For example, the user may be authorized to copy the document 300, but not scan the document 300. Thus, a scan button on the user interface 210 may be hidden or greyed out to prevent scanning of the document 300.

In one embodiment, the user interface 210 may provide a notification message if too many copies are attempted. For example, the user may be authorized to make 50 copies or fewer of the document 300. If the user attempts to make 100 copies, the user interface 210 may notify the user that the number of copies is prohibited and notify the user how many allowable copies are remaining.

The reproduction job request may be executed in accordance with the document control information. The executed job may be provided to the authentication server 110 to update the document control information. For example, the user may have made 20 copies of the document 300. Thus, the authentication server may update the document control information to indicate that 30 allowable copies remain.

In one embodiment, the document control information may be tracked locally by the apparatus 102. For example, the user can be authorized by the authentication server 110. However, the limits to the reproductions type and or a number of the allowable reproduction types can be controlled locally by the apparatus 102.

In one embodiment, if the authentication server 110 cannot be reached to authorize the user the job request can be deleted. For example, the communications interface 208 may be malfunctioning or the IP network 108 may be down. As a result, the apparatus 102 may be unable to send an authentication request to the authentication server 110. If the authentication server 110 cannot be reached, any job requests submitted by the user may be deleted from the queue. A notification may be presented to the user on the user interface 210 indicating that authentication could not be completed and the job request cannot be completed.

Thus, the present disclosure provides machine readable codes that may contain document control information to limit or control reproduction of a document. The user may provide the desired document control information, and the information may be registered with an authentication server. The machine readable code can be printed on the document that is generated and used to control reproduction of printed documents (e.g., paper copies of documents).

The MFDs can be modified to generate and detect the machine readable codes. Job requests cannot be executed on the MFD without authenticating the users' rights to reproduction of the document based on the document control information contained in the machine readable code. This may provide an added layer of security for printed documents to protect sensitive documents, protect copyrights, and the like.

Figure 4:
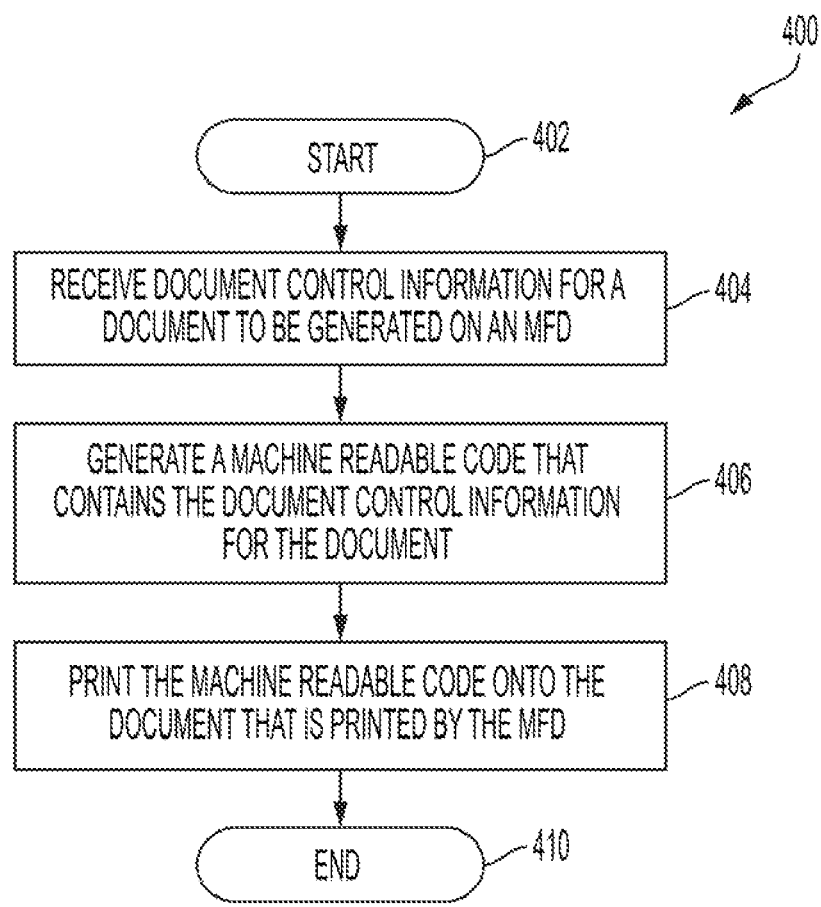
FIG. 4 illustrates a flow chart for a method of generating a machine readable code to limit reproduction of a document of the present disclosure.

FIG. 4 illustrates a flow chart of an example method 400 for generating a machine readable code to limit reproduction of a document of the present disclosure. In one embodiment, the method 400 may be performed by the apparatus 102 or by an apparatus such as the apparatus 600 illustrated in FIG. 6 and discussed below.

In one embodiment, the method 400 begins at block 402. At block 404, the method 400 receives document control information for a document to be generated on the MFD. For example, a user may provide information related to how a document can be reproduced (e.g., copy, print, fax, email, scan, and the like), how many reproductions can be made for each type of reproduction of the document (e.g., 500 copies, 50 prints, 1 email, 25 scans, and the like), a time limit or expiration to the limits (e.g., the authorization expires in 1 week), and usernames and passwords of authorized users who can execute the reproductions. The document control information may also include a document identification (e.g., a file number or name) for the document. Thus, each machine readable code may be associated with a particular document.

At block 406, the method 400 generates a machine readable code that contains the document control information for the document. For example, the document control information can be part of a barcode or QR code that can be printed onto the document. The machine readable code may also include an address (e.g., a web address or IP address) of an authentication server or remotely located server.

Thus, when the document with the machine readable code is placed on an MFD at a later time, the MFD can scan the document for the machine readable code to access the document control information. The MFD can automatically establish a communication session with the authentication server to perform authentication of any reproduction job request for the document via the MFD.

At block 408, the method 400 prints the machine readable code onto the document that is printed by the MFD. When the document is completed, the MFD may print out the document with the machine readable code. The machine readable code may be printed discreetly in a header, a footer, or any other portion of the margin of the document. The machine readable code may be printed on each page of the document if the document includes multiple pages. At block 410, the method 400 ends.

Figure 5:
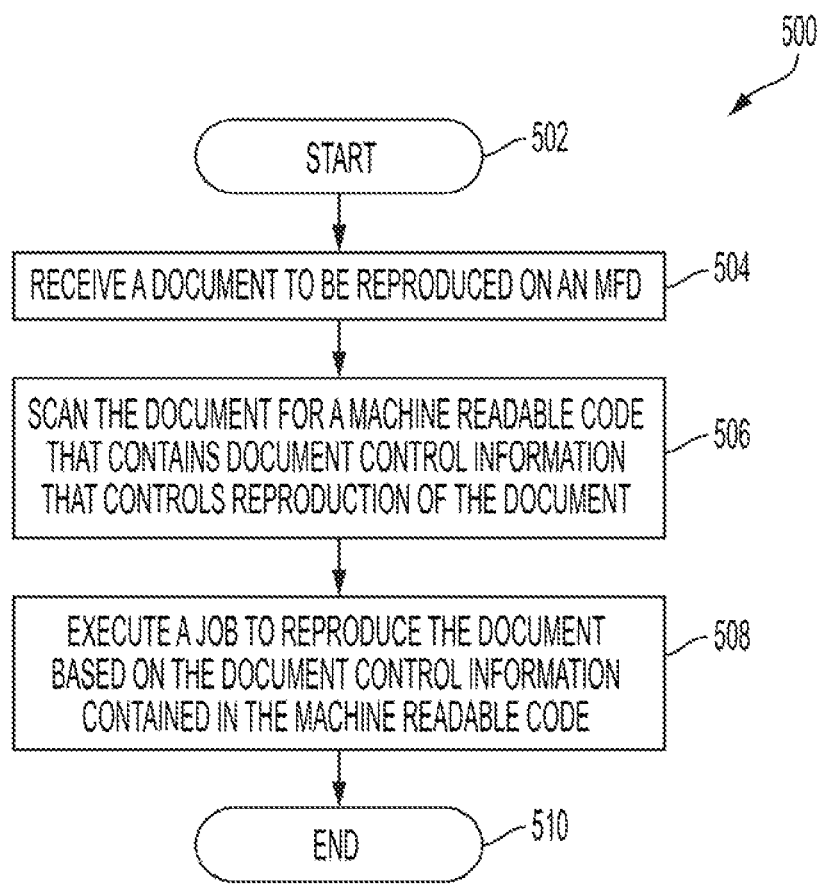
FIG. 5 illustrates a flow chart for a method of reproducing a document with a machine readable code to limit reproduction of the present disclosure.

FIG. 5 illustrates a flow chart of an example method 500 for reproducing a document with a machine readable code to limit reproduction of the present disclosure. In one embodiment, the method 500 may be performed by the apparatus 102 or by an apparatus such as the apparatus 600 illustrated in FIG. 6 and discussed below.

In one embodiment, the method 500 begins at block 502. At block 504, the method 500 receives a document to be reproduced on an MFD. For example, a printed document may be placed in the MFD (e.g., on a platen glass or automatic document feeder tray). The user may enter a username and password and a reproduction job request for the document. For example, the user may request that the MFD generate 50 copies of the document.

At block 506, the method 500 scans the document for a machine readable code that contains document control information that controls reproduction of the document. For example, the MFD may use an optical scanner to scan the document. In one embodiment, if there are multiple pages, the MFD may scan all of the pages of the document to detect the machine readable code on each page.

The scan may be used to obtain document control information for the document and to perform additional error scanning before executing the reproduction job request. For example, if there are multiple pages, the initial scan of the machine readable code on each page can detect if a page from a different document is accidentally mixed in with a document. If a rogue page is detected in the document, the MFD may notify the user that page x of y is not part of this document and request that the user remove the page before authentication for the reproduction job request is performed.

The MFD may obtain the authentication server address from the document control information in the machine readable code. The MFD may establish a communication session with the authentication server. The MFD may send the username and password of the user and the document control information to the authentication server.

The authentication server may determine if the username and password match a list of authorized usernames and passwords for the document that is identified. The authentication server may determine the allowable reproduction types and amounts for the user who is authorized. The authentication server may also check any expiration time limits to an internal clock, if applicable, to make sure the reproduction rights have not expired.

If the user is authorized, the authentication server may send a notification to the MFD indicating that the user is authorized and providing reproduction rights information. The MFD may then compare the reproduction job request (e.g., 50 copies) to the allowable reproduction types and limits (e.g., the user may be authorized to make 100 copies).

In one embodiment, the MFD may perform authorization of the user via the authentication server, but process the document control information locally. For example, the MFD may read the machine readable code and see that the document can only be copied 100 times.

At block 508, the method 500 executes a job to reproduce the document based on the document control information contained in the machine readable code. For example, the reproduction job request to generate 50 copies of the document can be executed.

In one embodiment, the MFD may transmit the jobs that were executed to the authentication server. For example, the MFD may transmit how many copies were made for a print job, how many times a document was scanned for a scan job, and the like. The authentication server may then update the reproduction rights of the user. For example, if the user was allowed to make 100 copies, the authentication server may update the rights of the user to 50 remaining copies.

In one embodiment, the MFD may update the machine readable code after the job is executed. For example, the MFD may annotate the machine readable code (e.g., print an additional machine readable code on the document) to indicate updated document control information (e.g., to indicate that the user can generate 50 more copies of the document, down from 100 copies). Once the reproduction limits of the user for the document is reached, any additional reproduction jobs requested for the document on the MFD may be denied. At block 510, the method 500 ends.

Figure 6:
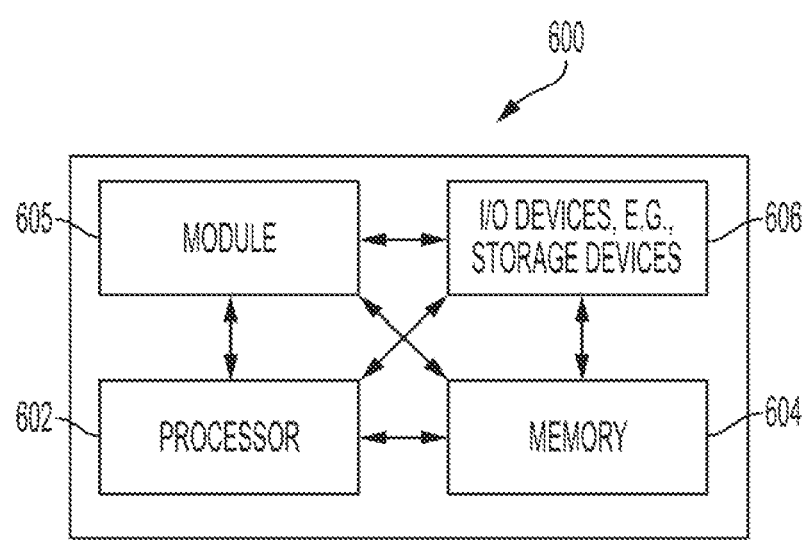
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for generating a machine readable code to limit reproduction of the document, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for generating a machine readable code to limit reproduction of the document (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for generating a machine readable code to limit reproduction of the document (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
   a communication interface to establish a communication path with an authentication server;
   a user interface to receive document control information for a document to be printed;
   a processor;
   a non-transitory computer-readable medium storing a plurality of instructions, which when executed by the processor, causes the processor to perform operations comprising:
      generate a machine readable code that contains the document control information for the document, wherein the document control information includes an address of the authentication server; and
      print the machine readable code onto a printed copy of the document that is printed by the MFD; and
   an optical scanner to detect the machine readable code on the printed copy of the document when a user attempts to reproduce the printed copy of the document on the MFD, wherein the instructions cause the processor further to:
      establish a communication session with the authentication server in response to detecting the machine readable code using the address found in the machine readable code to determine if the user is authorized to reproduce the printed copy of the document,
      wherein the instructions cause the processor further to:
         modify available reproduction buttons on a user interface of the MFD based on authentication information for reproduction of the printed copy of the document received from the authentication server.

2. The MFD of claim 1, wherein the instructions cause the processor further to:
   receive an authorization to reproduce the printed copy of the document.

3. The MFD of claim 1, wherein the instructions cause the processor further to:
   receive reproduction limits associated with the printed copy of the document; and
   allow a user to select reproduction options in accordance with the reproduction limits associated with the printed copy of the document.

4. The MFD of claim 1, wherein the instructions cause the processor further to:
   receive an indication that the user is not authorized to reproduce the printed copy of the document;
   notify the user is not authorized to reproduce the printed copy of the document; and
   delete any jobs associated with the printed copy of the document before execution of the jobs.

5. The MFD of claim 1, wherein the document control information comprises a username and password associated with the printed copy of the document.

6. The MFD of claim 1, wherein the document control information comprises a number of reproductions of the printed copy of the document that is authorized.

7. The MFD of claim 1, wherein the document control information a type of reproduction of the printed copy of the document that is authorized.

8. The MFD of claim 1, wherein the document control information comprises an expiration date and time for the printed copy of the document to be reproduced.

9. A method, comprising:
   receiving, via a processor of a multi-function device (MFD), document control information for a document to be printed;
   generating, by the processor, a machine readable code that contains the document control information for the document, wherein the document control information includes an address of an authentication server;
   printing, by the processor, the machine readable code onto a printed copy of the document that is printed by the MFD;
   receiving, by the processor, the printed copy of the document with the machine readable code;
   detecting, by the processor, the machine readable code before a reproduction job is executed by the MFD; and
   establishing, by the processor, a communication session with the authentication server in response to detecting the machine readable code using the address found in the machine readable code to determine if the user is authorized to reproduce the printed copy of the document,
   modifying, by the processor, available reproduction buttons on a user interface of the MFD based on authentication information for reproduction of the printed copy of the document received from the authentication server.

10. The method of claim 9, further comprising:
    establishing, by the processor, a communication session with an authentication server to register the document control information with the authentication server when the machine readable code is generated.

11. The method of claim 9, further comprising:
    receiving, by the processor, an authorization to reproduce the printed copy of the document.

12. The method of claim 11, further comprising:
    receiving, by the processor, reproduction limits associated with the printed copy of the document; and
    allowing, by the processor, a user to select reproduction options in accordance with the reproduction limits associated with the printed copy of the document.

13. The method of claim 9, further comprising:
    receiving, by the processor, an indication that the user is not authorized to reproduce the printed copy of the document;
    notifying, by the processor, the user is not authorized to reproduce the printed copy of the document; and
    deleting, by the processor, any jobs associated with the printed copy of the document before execution of the jobs.

14. The method of claim 9, wherein the document control information comprises a username and password associated with the printed copy of the document.

15. The method of claim 9, wherein the document control information comprises a number of reproductions of the printed copy of the document that is authorized.

16. A multi-function device (MFD), comprising:
    a user interface to receive document control information for a machine readable code to be printed onto a document that is to be printed, wherein the document control information comprises a username and password, a type of allowable reproduction, and a number of allowable number of reproductions for each type of allowable reproduction;
    an optical scanner to detect the machine readable code on a printed copy of the document when the MFD receives a job request to reproduce the printed copy of the document after the document with the machine readable code is printed by the MFD;
    a communication interface to establish a communication path with an authentication server to register the document control information when the machine readable code is generated and to authorize the job request to reproduce the printed copy of the document when the machine readable code on the printed copy of the document is detected in response to the job request;

a processor; and a non-transitory computer-readable medium storing a plurality of instructions, which when executed by the processor, causes the processor to perform operations, comprising:

generate the machine readable code that contains the document control information for the printed copy of the document, wherein the document control information further includes an address of the authentication server; and print the machine readable code onto the printed copy of the document that is printed by the MFD; and establish a communication session with the authentication server using the address found in the machine readable code to authorize the job request based on the document control information read from the machine readable code, wherein the instructions cause the processor further to: modify available reproduction buttons on a user interface of the MFD based on authentication information for reproduction of the printed copy of the document received from the authentication server.

* * * * *